United States Patent
Higashioji et al.

(10) Patent No.: US 10,960,597 B2
(45) Date of Patent: Mar. 30, 2021

(54) BIAXIALLY ORIENTED THERMOPLASTIC RESIN FILM

(71) Applicant: Toray Industries, Inc., Tokyo (JP)

(72) Inventors: Takuji Higashioji, Otsu (JP); Shinya Kawahara, Otsu (JP); Yukari Nakamori, Otsu (JP); Tadamasa Suzuki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 50 days.

(21) Appl. No.: 16/308,840

(22) PCT Filed: Jun. 7, 2017

(86) PCT No.: PCT/JP2017/021096
§ 371 (c)(1),
(2) Date: Dec. 11, 2018

(87) PCT Pub. No.: WO2017/221701
PCT Pub. Date: Dec. 28, 2017

(65) Prior Publication Data
US 2019/0160728 A1    May 30, 2019

(30) Foreign Application Priority Data
Jun. 24, 2016   (JP) .............................. JP2016-125524

(51) Int. Cl.
| | | |
|---|---|---|
| *B29C 55/14* | (2006.01) | |
| *G11B 5/73* | (2006.01) | |
| *C08J 5/18* | (2006.01) | |
| *C08J 7/12* | (2006.01) | |
| *G02B 1/04* | (2006.01) | |
| *B29C 55/18* | (2006.01) | |
| *B29D 7/01* | (2006.01) | |
| *B29K 23/00* | (2006.01) | |
| *B29K 67/00* | (2006.01) | |
| *B29K 79/00* | (2006.01) | |
| *B29K 81/00* | (2006.01) | |
| *B29L 7/00* | (2006.01) | |

(52) U.S. Cl.
CPC ............ *B29C 55/143* (2013.01); *B29C 55/18* (2013.01); *B29D 7/01* (2013.01); *C08J 5/18* (2013.01); *C08J 7/123* (2013.01); *G02B 1/04* (2013.01); *G11B 5/73935* (2019.05); *B29K 2023/00* (2013.01); *B29K 2067/003* (2013.01); *B29K 2079/08* (2013.01); *B29K 2081/04* (2013.01); *B29K 2995/0053* (2013.01); *B29K 2995/0094* (2013.01); *B29L 2007/001* (2013.01); *C08J 2367/02* (2013.01)

(58) Field of Classification Search
None
See application file for complete search history.

(56) References Cited

U.S. PATENT DOCUMENTS

| | | | | |
|---|---|---|---|---|
| 5,494,739 A | * | 2/1996 | Chuujou | C08J 5/18 428/323 |
| 5,928,759 A | * | 7/1999 | Arita | G11B 5/64 428/141 |
| 6,706,427 B2 | * | 3/2004 | Yokoyama | B32B 17/10981 428/846.9 |
| 7,022,396 B1 | * | 4/2006 | Kubota | C08J 5/18 428/141 |
| 7,871,691 B2 | * | 1/2011 | Hashimoto | H05K 1/0326 428/141 |
| 2011/0244118 A1 | * | 10/2011 | Lowery | G11B 5/70678 427/130 |

FOREIGN PATENT DOCUMENTS

| | | | |
|---|---|---|---|
| JP | 5917623 A | | 9/1984 |
| JP | 0269534 A | | 3/1990 |
| JP | 0680808 A | | 3/1994 |
| JP | 06080808 A | * | 3/1994 |
| JP | 0830958 A | | 2/1996 |
| JP | 2000191810 A | | 7/2000 |
| JP | 2001253958 A | * | 9/2001 |
| JP | 2001253958 A | | 9/2001 |
| JP | 2008243358 A | | 10/2008 |
| JP | 2009280830 A | | 12/2009 |

OTHER PUBLICATIONS

International Search Report and Written Opinion for International Application No. PCT/JP2017/021096, dated Aug. 29, 2017—5 pages.

* cited by examiner

*Primary Examiner* — Kevin M Bernatz
(74) *Attorney, Agent, or Firm* — RatnerPrestia

(57) ABSTRACT

A biaxially oriented thermoplastic resin film has at least one surface of which has protrusions each having a height of 1 nm or more and less than 2 nm at a density of $1\times10^7$ to $1\times10^9$ protrusions per $mm^2$. The thermoplastic resin film is capable of suppressing generation of coarse protrusions and contaminants, and defects in a processing process while having slipperiness.

10 Claims, No Drawings

BIAXIALLY ORIENTED THERMOPLASTIC RESIN FILM

CROSS REFERENCE TO RELATED APPLICATIONS

This is the U.S. National Phase application of PCT/JP2017/021096, filed on Jun. 7, 2017, which claims priority to Japanese Patent Application No. 2016-125524, filed Jun. 24, 2016, the disclosures of these applications being incorporated herein by reference in their entireties for all purposes.

FIELD OF THE INVENTION

The present invention relates to a biaxially oriented thermoplastic resin film having fine protrusions on at least one surface thereof.

BACKGROUND OF THE INVENTION

Thermoplastic resins are used in various industrial fields because they have favorable processability. In addition, products obtained by processing the thermoplastic resins into a film shape play an important role in today's life in industrial applications, optical product applications, packaging applications and so on. In recent years, downsizing and enhancement of integration of electronic information devices have progressed, and accordingly, smoothness has been required for a film as a base material. On the other hand, in handling of these film products, slipperiness thereof is particularly important, and when slipperiness is low, the problem may arise that wrinkles and scratches are generated during a production process and a processing process. Thus, the demand for smoothness and slipperiness of the surface of the film is more and more increasing. However, when smoothness is enhanced, slipperiness tends to be reduced, and it is difficult to obtain a film excellent in both smoothness and slipperiness.

In recent years, a dry film resist (DFR) using a polyester film as a substrate has been often used for production of printed circuit substrates, semiconductor packages, flexible substrates and the like. Generally, DFR has a sandwich structure in which a photosensitive layer (photoresist layer) is sandwiched between a base material film composed of a polyester film and a protective film (cover film) composed of a polyolefin film or the like. For preparing a conductor circuit using the DFR, the following operation is generally carried out.

That is, a protective film is peeled off from DFR, and the DFR is laminated to a substrate/conductive base material layer in such a manner that the exposed surface of a resist layer and the surface of the conductive base material layer such as, for example, a copper foil on the substrate come into close contact with each other. Next, a reticle printed with a conductor circuit pattern is placed on a base material composed of a polyester film, and from above the reticle, a resist layer mainly composed of a photosensitive resin is irradiated with light to be exposed. Thereafter, the reticle and the polyester film are peeled off, and unreacted components in the resist layer are then dissolved and removed with a solvent. Etching is performed with an acid or the like to dissolve and remove exposed portions in the conductive base material layer. As a result, photoreaction portions in the resist layer and conductive base material layer portions corresponding to the photoreaction portions remain as such. Thereafter, the remaining resist layer is removed to form a conductor circuit on the substrate. Since a conductor circuit is formed in this method, a polyester film as a substrate is required to have high light permeability which enables light to be transmitted without disturbance.

Particularly, in recent years, polyester films for dry film resist substrates which are excellent in smoothness, i.e. which are excellent in permeability, has a low haze, is capable of attaining high resolution, have been required with downsizing and weight saving of OA equipment and IT equipment.

In addition, smartphones have recently come into wide use, and accordingly, downsizing and capacity enhancement of multilayer ceramic capacitors have progressed. Thus, as release films to be used for production of multilayer ceramic capacitors, demand for polyester films having high smoothness and having no defects on the film surface and in the film have rapidly increased. As surface characteristics of a polyester film to be used as a base material, the quality of a smooth surface thereof tends to easily affect the quality of a green sheet product after processing. In addition, the quality of a rough surface tends to affect the quality of a green sheet product after processing. For example, undulations on a smooth surface subjected to green sheet processing may be associated with the quality of a multilayer ceramic capacitor, or protrusions on the rough surface side may be transferred to a green sheet at the time of winding the green sheet, leading to generation of scratches and dents, although such a problem has not been raised for conventional polyester films.

Members to be used for a liquid crystal display or the like include a polarizing plate, a retardation polarizing plate or a retardation plate, and the polarizing plate is normally composed of a polarizing film, a surface protecting film, a pressure-sensitive adhesive layer and a release film. The polarizing film has a structure in which a polarizer that is obtained by adsorbing a polarizing element such as iodine or a dichroic dye to a hydrophilic film such as a polyvinyl alcohol-based film, and orienting the polarizing element and that has a polarizing axis and an adsorption axis is covered with a cellulose-based film from the upper and lower sides, or coated with an acryl-based resin. As the surface protecting film, a transparent plastic film such as a polyester film is used which has low moisture permeability and less deformation such as elongation. The surface protecting film and the polarizing film are bonded to each other with an adhesive, and as the adhesive, one that firmly adheres to the surface protecting film, but can be easily peeled off from the polarizing film even after elapse of days. The pressure-sensitive adhesive layer is formed of a pressure-sensitive adhesive or the like for gluing the polarizing film to a liquid crystal cell, and the release film is formed of a polyester film or the like. In production of such a polarizing plate, the optical properties, such as a light transmittance, a degree of polarization and a haze of a polarizing film as a raw material are inspected before the polarizing film is used, but defects may be generated due to mechanical stress, ingress and sticking of contaminants and the like to the polarizing film in a production process of the polarizing plate. Thus, in examination of ingress of contaminants and defects for final products, inspection with human eyes is performed by a cross nicol method (transmitted light is observed in a state in which the polarizing surfaces of two polarizing plates are orthogonal to each other, and the film is sandwiched therebetween while the longitudinal direction and the transverse direction of the film are aligned with the polarizing surfaces of the orthogonal polarizing plates, respectively). In visual inspection of an actual polarizing plate, the polarizer and the film in the cross nicol method is replaced by a polarizing plate to be inspected, and the polarizing plate is superposed on a normal analyzer in such a manner that the polarizing surface of the polarizing plate is orthogonal to the polarizing surface of the analyzer. Thus, in principle, defective spots such as ingress of contaminants and defects in the polarizing plate appear as bright spots, and therefore defects can be visually inspected. However, at present, a biaxially oriented polyester film used as a release film of a polarizing plate is apt to cause light leakage at the time of inspecting a polarizing plate by the cross nicol method, and thus there arises the problem that it is difficult to perform accurate visual inspection, so that bright spots indicating ingress of contaminants and defects in the polarizing plate are overlooked.

In addition, when used as a substrate for a magnetic recording medium, high density recording is always required for a magnetic recording medium, and in order to achieve further high density recording, thinning of the magnetic layer and fine particle magnetization. It is effective to further improve the smoothness of the magnetic layer surface by using the body.

In a substrate for a magnetic recording medium, which is obtained using ferromagnetic hexagonal ferrite powder, in recent years, roughening of not only a smooth surface but also a running surface is restricted due to thinning of a magnetic layer, a non-magnetic layer, a back coat layer and a substrate itself. When the film is stored in a roll form as a magnetic recording medium in a production process, there is the problem that protrusions formed on the running surface are transferred to the magnetic surface to form dents on a smooth magnetic layer surface, so that smoothness of the magnetic layer surface is deteriorated, leading to degradation of electromagnetic conversion characteristics. Merely by reducing the particle diameter and concentration of particles contained on the running surface side of the substrate for improving the smoothness of the magnetic layer surface, coarse protrusions cannot be improved yet because the position regulation in the thickness direction of the particle is insufficient. In addition, when the smoothness of the running surface is improved, the runnability, winding, slittability, and the durability of the surface are insufficient.

Therefore, requirements for improvement of properties such as runnability, winding property, and surface smoothness to be attained in parallel are problems that are always raised for high-density recording.

It is known that for meeting the above-mentioned requirements, it is effective to form fine protrusions to the extent that slipperiness can be imparted to the film surface while smoothness is not affected. For example, for forming fine protrusions on the film surface, a film containing substantially spherical silica particles typified by colloidal silica is known (Patent Document 1). In addition, a polyester film is known in which a thin film layer containing fine particles for forming surface protrusions is stacked on a base layer (Patent Document 2).

PATENT DOCUMENTS

Patent document 1: Japanese Unexamined Patent Application Publication No. 59-171623
Patent document 2: Japanese Unexamined Patent Application Publication No. 8-30958

SUMMARY OF THE INVENTION

However, when a film contains a large amount of fine particles, there is the problem that coarse protrusions are formed due to aggregation of particles, process contamination occurs due to falling of particles, or particle-derived contaminants are generated. In view of the above circumstances, an object of the present invention is to provide a biaxially oriented thermoplastic resin film which is capable of suppressing generation of coarse protrusions and contaminants and suppressing defects in a processing process while having smoothness and slipperiness.

For achieving the above-described object, the present invention has the following constitutions. Specifically,

[I] a biaxially oriented thermoplastic resin film, at least one surface of which has protrusions each having a height of 1 nm or more and less than 2 nm at a density of $1 \times 10^7$ to $1 \times 10^9$ protrusions per $mm^2$;

[II] the biaxially oriented thermoplastic resin film according to [I], wherein the metal friction coefficient ($\mu k$) of the film surface having protrusions each having a height of 1 nm or more and less than 2 nm at a density of $1 \times 10^7$ to $1 \times 10^9$ protrusions per $mm^2$ is 0.1 to 0.5;

[III] the biaxially oriented thermoplastic resin film according to [I] or [II], wherein the haze is 0.1 to 2.0%; [IV] the biaxially oriented thermoplastic resin film according to any one of [I] to [III], wherein the density of protrusions each having a height of 10 nm or more on the film surface having protrusions each having a height of 1 nm or more and less than 2 nm at a density of $1 \times 10^7$ to $1 \times 10^9$ protrusions per $mm^2$ is $1 \times 10^6$ protrusions per $mm^2$ or less;

[V] the biaxially oriented thermoplastic resin film according to any one of [I] to [IV], wherein the thermoplastic resin constituting the biaxially oriented thermoplastic resin film contains one of polyester, polyolefin, polyphenylene sulfide and polyimide as a main component;

[VI] the biaxially oriented thermoplastic resin film according to any one of [I] to [V], wherein the kurtosis of the film having protrusions each having a height of 1 nm or more and less than 2 nm at a density of $1 \times 10^7$ to $1 \times 10^9$ protrusions per $mm^2$ is more than 3.0 and not more than 8.0;

[VII] the biaxially oriented thermoplastic resin film according to any one of [I] to [VI], which is used as a release film;

[VIII] the biaxially oriented thermoplastic resin film according to [VII], which is used as a film for a dry film resist substrate;

[IX] the biaxially oriented thermoplastic resin film according to [VII], which is used as a film for a substrate for molding of a green sheet in a process for producing a multilayer ceramic capacitor;

[X] the biaxially oriented thermoplastic resin film according to [VII], which is used as a release film for polarizer;

[XI] the biaxially oriented thermoplastic resin film according to any one of [I] to [VI], which is used as a film for an optical member;

[XII] the biaxially oriented thermoplastic resin film according to any one of [I] to [VI], which is used as a base film for a magnetic recording medium of coat-type digital recording type; and

[XIII] a magnetic recording medium using the biaxially oriented thermoplastic resin film according to any one of [I] to [VI].

A biaxially oriented thermoplastic resin film of the present invention is capable of suppressing generation of coarse protrusions and contaminants and suppressing defects in a processing process while having smoothness and slipperiness.

DETAILED DESCRIPTION OF EMBODIMENTS OF THE INVENTION

Hereinafter, the present invention will be described in detail.

The thermoplastic resin mentioned in the present invention is a resin exhibiting plasticity when heated, and typical examples of the resin include polyesters having an ester bond in the main chain as typified by polyethylene terephthalate, polyethylene naphthalate, polybutylene terephthalate, polyethylene α,β-dicarboxylate, polymers from P-hexahydro-xylylene terephthalate, polymers from 1,4-cyclohexanedimethanol, poly-P-ethyleneoxybenzoate, polyarylate, polycarbonate and the like, and copolymers thereof; polyamides having an amide bond in the main chain as typified by nylon 6, nylon 66, nylon 610, nylon 12, nylon 11 and the like; polyolefins mainly composed only of hydrocarbon as typified by polyethylene, polypropylene, ethylene-vinyl acetate copolymers, polymethylpentene, polybutene, polyisobutylene, polystyrene and the like; polyethers typified by polyether sulfone (PES), polyphenylene oxide (PPO), polyether ether ketone (PEEK), polyethylene oxide, polypropylene oxide, polyoxymethylene and the like; halogenated polymers typified by polyvinyl chloride, polyvinylidene chloride, polyvinylidene fluoride, polychlorotrifluoroethylene and the like; polyphenylene sulfide (PPS), polysulfone, and copolymers and modified products thereof; and polyimides.

In the present invention, it is preferable that polyester, polyolefin, polyphenylene sulfide (PPS) or polyimide (PI) is used as a main component from the viewpoint of transparency and film forming ability, and among them, polyester is more preferable. The "main component" mentioned here refers to a component contained in an amount of more than 50% by mass and not more than 100% by mass based on 100% by mass of all components of the film.

In addition, the polyester mentioned in the present invention is one obtained by polycondensation of a dicarboxylic acid constituent component and a diol constituent component. In this specification, the constituent component refers to a minimum unit that can be obtained by hydrolyzing polyester.

Examples of the dicarboxylic acid constituent component constituting the polyester include dicarboxylic acids such as aliphatic dicarboxylic acids such as malonic acid, succinic acid, glutaric acid, adipic acid, suberic acid, sebacic acid, dodecanedioic acid, dimer acid, eicosanedionic acid, pimelic acid, azelaic acid, methylmalonic acid and ethylmalonic acid; cycloaliphatic dicarboxylic acids such as adamantanedicarboxylic acid, norbornenedicarboxylic acid, isosorbide, cyclohexanedicarboxylic acid and decalinedicarboxylic acid; and aromatic dicarboxylic acids such as terephthalic acid, isophthalic acid, phthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, 4,4'-diphenyletherdicarboxylic acid, 5-sodium sulfoisophthalic acid, phenylenedanedicarboxylic acid, anthracenedicarboxylic acid, phenanthrenedicarboxylic acid, and 9,9'-bis(4-carboxyphenyl)fluorenic acid, or ester derivatives thereof.

In addition, examples of the diol constituent component constituting the polyester include diols such as aliphatic diols such as ethylene glycol, 1,2-propanediol, 1,3-propanediol, 1,4-butanediol, 1,2-butanediol and 1,3-butanediol, cycloaliphatic diols such as cyclohexanedimethanol, spiroglycol and isosorbide, bisphenol A, 1,3-benzenedimethanol, 1,4-benzenedimethanol, 9,9'-bis(4-hydroxyphenyl)fluorene, aromatic diols, and series of a plurality of the aforementioned diols.

In the polyester for use in the present invention, monofunctional compounds such as lauryl alcohol and phenyl isocyanate may be copolymerized, or trifunctional compounds such as trimellitic acid, pyromellitic acid, glycerol, pentaerythritol and 2,4-dioxybenzoic acid, and the like may be copolymerized as long as excessive branching or crosslinking does not occur, and the polymer is substantially linear. In addition to the acid component and the diol component, aromatic hydroxycarboxylic acids such as p-hydroxybenzoic acid, m-hydroxybenzoic acid and 2,6-hydroxynaphthoic acid, p-aminophenol, p-aminobenzoic acid, and the like may be further copolymerized in such a small amount that the effect of the present invention is not impaired. As the polyester, polyethylene terephthalate and polyethylene naphthalate are preferably used. In addition, the polyester may be a Copolymer or a modified product thereof. From the viewpoint of crystallinity, it is preferable that polyethylene terephthalate (PET) and polyethylene naphthalate (PEN) are used as a main component.

The thermoplastic resin film of the present invention is required to be biaxially oriented. When the film is biaxially oriented, the mechanical strength of the film can be increased to improve slipperiness. The "biaxial orientation" mentioned here refers to a biaxial orientation pattern shown in wide angle X-ray diffraction. Generally, a biaxially oriented thermoplastic resin film can be obtained by stretching an unstretched thermoplastic resin sheet in sheet longitudinal direction and in transverse direction, and then performing heat treatment to complete crystal orientation. Details will be described later.

In the biaxially oriented thermoplastic film of the present invention, at least one surface is required to have protrusions each having a height of 1 nm or more and less than 2 nm at a density of $1 \times 10^7$ to $1 \times 10^9$ protrusions per $mm^2$. The density is preferably $2 \times 10^7$ or more and $1 \times 10^9$ or less protrusions per $mm^2$, more preferably more than $3 \times 10^7$ and not more than $1 \times 10^9$ protrusions per $mm^2$. When the density of protrusions on the surface is set to the above-described value, slipperiness is developed by fine protrusions arranged at a high density. When the density of protrusions is deviated from the above-described value, there may arise the problem that slipperiness is degraded, leading to generation of film surface defects such as scratches during film formation, or process contamination occurs.

The method for setting the height of protrusions on the film surface to a value in the above-described range is not particularly limited, and examples thereof include a method in which a shape is transferred to the surface using a mold as in nanoimprint, and a method in which surface treatment such as UV irradiation, corona treatment by arc discharge, plasma treatment is performed, but from the viewpoint of adaptability to inline film formation, and the number of fine protrusions formed, UV irradiation, corona treatment by arc discharge, and plasma treatment by atmospheric pressure glow discharge. From the viewpoint of uniformity of treatment (i.e. uniformity of fine protrusions formed on the film surface) and reduced damage to the film, plasma treatment by atmospheric pressure glow discharge under conditions as described later is more preferable. The atmospheric pressure mentioned here is a pressure in a range of 700 Torr to 780 Torr.

In the atmospheric pressure glow discharge treatment, a film to be treated is led between opposing electrodes and grounded roll, a plasma excitation gas is introduced into an apparatus, and a high frequency voltage is applied between the electrodes to plasma-excite the gas, so that glow discharge is performed between the electrodes. As a result, the film surface is finely ashed to form protrusions.

The plasma excitation gas is a gas that can be plasma-excited under the above-described conditions. Examples of the plasma excitation gas include rare gases such as argon, helium, neon, krypton and xenon, nitrogen, carbon dioxide, oxygen, fluorocarbons such as tetrafluoromethane, and mixtures thereof. In addition, one of the plasma excitation gases may be used singly, or two or more of the plasma excitation gases may be combined at any mixing ratio. The frequency of the high frequency voltage in plasma treatment is preferably in a range of 1 kHz to 100 kHz. In addition, the discharge treatment intensity (E value) determined by the following method is preferably in a range of 10 to 2000 W·min/m$^2$, more preferably 40 to 800 W·min/m$^2$ from the viewpoint of forming protrusions. When the discharge treatment intensity (E value) is excessively low, it may be impossible to sufficiently form protrusions, and when the discharge treatment intensity (E value) is excessively high, the thermoplastic resin film may be damaged, or the height of the protrusions formed may be more than 2 nm.

<Method for Determining Discharge Treatment Intensity (E Value)>

$$E = Vp \times Ip / (S \times Wt)$$

E: E value (W·min/m$^2$)
Vp: applied voltage (V)
Ip: applied current (A)
S: treatment speed (m/min)
Wt: treatment width (m).

When the biaxially oriented thermoplastic resin film of the present invention is subjected to surface treatment such as UV irradiation, corona treatment by arc discharge or plasma treatment by glow discharge, the temperature of the surface of the film subjected to surface treatment is preferably 150° C. or lower. The temperature is more preferably 100° C. or lower. When the surface temperature is higher than 150° C., crystallization of the film proceeds, coarse protrusions may be formed on the surface, or mobility of molecular chains in the film may be increased, thus causing damage to the film by surface treatment. The temperature of the surface of the film subjected to surface treatment is preferably 25° C. or higher from the viewpoint of enhancing the treatment effect without excessively reducing the mobility of molecular chains in the film. The temperature of the surface of the film subjected to surface treatment can be adjusted by cooling a surface opposite to the treated surface using a cooling roll or the like.

In addition, in the biaxially oriented thermoplastic film of the present invention, the metal friction coefficient (μk) of the film surface having protrusions each having a height of 1 nm or more and less than 2 nm at a density of 1×10$^7$ to 1×10$^9$ protrusions per mm$^2$ is preferably 0.1 to 0.5. When the metal friction coefficient (μk) is more than 0.5, there may arise the problem that the runnability of the film may be deteriorated, leading to generation of film surface defects such as scratches during film formation, or process contamination occurs. On the other hand, when the metal friction coefficient (μk) is less than 0.1, there may arise the problem that slipperiness is excessively high, so that the film is not stabilized, and thus handling characteristics during the processing process is deteriorated. The metal friction coefficient (μk) can be adjusted by orientation crystallization and the film thickness. For example, when the degree of orientation is reduced (an unstretched film or a film having a low degree of orientation), or the film thickness is made thin, the metal friction coefficient (μk) increases. The metal friction coefficient (μk) is more preferably 0.1 or more and less than 0.4, most preferable 0.1 or more and less than 0.3.

Preferably, the biaxially oriented thermoplastic film of the present invention has a haze of 0.1 to 2.0%. When the haze is in the above-described range, the film can be suitably used in applications in which transparency is required, such as applications of optical devices and dry film resists. The haze is more preferably 0.1 to 1.0%, especially preferably 0.1 to 0.6%. The haze can be adjusted by the amount of particles contained in the resin constituting the film, the crystallinity of the resin constituting the film, and the roughness of the film surface. For example, when the amount of particles contained in the resin constituting the film is increased, crystallization of the resin as a main constituent component constituting the film is promoted, or the roughness of the film surface is made rough, the haze tends to increase.

In the biaxially oriented thermoplastic film of the present invention, the density of protrusions each having a height of 10 nm or more on the film surface having protrusions each having a height of 1 nm or more and less than 2 nm at a density of 1×10$^7$ to 1×10$^9$ protrusions per mm$^2$ is preferably 1×10$^6$ protrusions per mm$^2$ or less. The density is more preferably 1×10$^5$/mm$^2$ or less. When the density of protrusions each having a height of 10 nm or more is above the above-described range, surface scattering may increases, leading to deterioration of the haze, or surface protrusions may become uneven, leading to an increase in friction with metal. The density of protrusions each having a height of 10 nm or more can be adjusted by treatment conditions for the surface treatment, and the crystallinity of the thermoplastic resin which is a main constituent component. For example, when corona treatment by arc discharge is performed under the condition of a large E value, or PP or PPS having high crystallinity is used as a main constituent component of the film, the density of protrusions each having a height of 10 nm or more increases.

In the biaxially oriented thermoplastic resin film of the present invention, the kurtosis (Rku) on a roughness curve for the film having protrusions each having a height of 1 nm or more and less than 2 nm at a density of 1×10$^7$ to 1×10$^9$ protrusions per mm$^2$ is preferably more than 3.0 and not more than 8.0. The kurtosis (Rku) on a roughness curve as mentioned here is determined in accordance with JIS B 0601 (2001), and serves as a measure of the sharpness of surface irregularity. When Rku is 3, protrusions form the shape of a normal distribution which is symmetrical. When the Rku is more than 3, protrusions form a distribution having the shape of a pointed height distribution. When Rku is less than 3, protrusions form a distribution having such a shape that the surface irregularity is collapsed along a height distribution. Preferably, the biaxially oriented thermoplastic resin film of the present invention has a Rku of 3.1 to 8.0, i.e. a shape in which protrusions on the surface are sharpened. Generally, when a thermoplastic resin film contains particles, the heights of protrusions formed on the film surface are uneven, and since each of the protrusions is coarse, a surface having steep protrusions and a flat base is formed, and the steep protrusions cause Rku to exceed 8.0. When the Rku of at least one surface of the thermoplastic resin film is set to the above-described value, slipperiness is improved, and defects such as scratches in the process for forming the film can be suppressed. When Rku is less than 3.1, the protrusions on the surface are gentle, and thus the contact area of the surface increases, so that slipperiness may be deteriorated, leading to an increase the possibility that defects are generated. On the other hand, when Rku is more than 8.0, protrusions may be excessively steep, leading to impairment of smoothness. Rku is more preferably 3.0 or more and 5.0 or less.

The biaxially oriented thermoplastic resin film of the present invention may contain particles as long as the effect of the present invention can be obtained. As the particles, either inorganic particles or organic particles can be used. Specific examples thereof include inorganic particles such as particles of clay, mica, titanium oxide, calcium carbonate, wet silica, dry silica, colloidal silica, calcium phosphate, barium sulfate, alumina silicate, kaolin, talc, montmorillonite, alumina and zirconia; organic particles containing acrylic acids, styrene-based resin, silicone, imide or the like as a constituent component; and core-shell-type organic particles. In addition, the size of the particles is preferably 0.2 μm or less in terms of an average particle diameter.

The biaxially oriented thermoplastic resin film of the present invention may contain various additives such as antioxidants, heat stabilizers, weathering stabilizers, ultraviolet absorbers, organic lubricants, pigments, dyes, organic or inorganic fine particles, fillers, antistatic agents, nucleating agents and the like as long as the effect of the present invention can be obtained.

A method for producing the biaxially oriented thermoplastic resin film of the present invention will now be described with a biaxially oriented polyester film as an example, but the present invention is not construed to be limited to films obtained in this example.

As a method for obtaining polyester for use in the present invention, a conventional polymerization method can be adopted. For example, a dicarboxylic acid component such as terephthalic acid or an ester forming derivative thereof and a diol component such as ethylene glycol or an ester forming derivative thereof are subjected to a transesterification reaction or an esterification reaction, followed by followed by carrying out a melt polymerization reaction. If necessary, the polyester obtained by the melt polymerization reaction may be subjected to a solid phase polymerization reaction at a temperature equal to or lower than the melting point of the polyester.

The polyester film of the present invention can be obtained by a previously known production method, but by carrying out the stretching and heat treatment process under the following conditions, the density of protrusions each having a height of 1 nm or more and less than 2 nm can be made to fall within the above-described range, which is preferable.

For the polyester film of the present invention, a method can be used in which a raw material dried as necessary is heated and melted in an extruder, and extruded onto a cooled cast drum from a die to form a sheet (melt casting method). As another method, a method can also be used in which a raw material is dissolved in a solvent, the solution is extruded from a die onto a substrate such as a cast drum or an endless belt to form a film, and the solvent is dried and removed from the film layer to form a sheet (solution casting method).

When a multilayer polyester film having two or more layers is produced by a melt casting method, a method is suitably used in which an extruder is used for each layer constituting the multilayer polyester film, and raw materials for the respective layers are melted, and stacked in a molten state in a merging device provided between the extruder and the die, and are then led to a die, and extruded onto a cast drum from the die to form a sheet. The multilayer sheet is electrostatically brought into close contact with a drum cooled to a surface temperature of 10° C. or more 60° C. or less, so that the sheet is cooled and solidified to prepare an unstretched sheet.

Next, a shape is transferred to a surface of the thus-obtained unstretched film using a mold as in nanoimprint, and the film is subjected to surface treatment such as corona treatment by ultraviolet light irradiation, corona treatment by arc discharge, plasma treatment by glow discharge. While the surface treatment may be performed immediately after the unstretched film is obtained, or after the film is slightly stretched or after the film is longitudinally and/or laterally stretched, it is preferable to subject the unstretched film to surface treatment in the present invention. In particular, it is preferable to perform plasma treatment by glow discharge under atmospheric pressure. When atmospheric pressure plasma treatment is performed, the polymer molecular chains present on the outermost surface layer of the thermoplastic resin film are finely cut, so that etching easily occurs in which fine portions are locally scraped off. In addition, the surface to be subjected to surface treatment may be either a surface (drum surface) which is in contact with the cast drum, or a surface (non-drum surface) which is not in contact with the cast drum.

Thereafter, if necessary, the stretched film is biaxially stretched to be biaxially oriented. For example, after atmospheric pressure plasma treatment, fine etching is locally performed, so that portions which are not etched are evenly dispersed on the surface, and protrusions are easily formed in subsequent stretching. As a stretching method, a sequential biaxial stretching method or a simultaneous biaxial stretching method can be used. A sequential biaxial stretching method in which stretching is performed first in longitudinal direction and then in transverse direction is more effective for obtaining the film of the present invention without causing stretching breakage of the film.

The thus-obtained biaxially oriented thermoplastic resin film of the present invention is capable of suppressing generation of coarse protrusions and contaminants and suppressing defects in a processing process while having smoothness and slipperiness. The biaxially oriented thermoplastic film can be suitably used as a release film (particularly, a film for a dry film resist substrate, a film for a substrate for forming a green sheet in a process for producing a multilayer ceramic capacitor, or a release film for polarizer), a film for an optical member, or a base film for a magnetic recording medium of coat-type digital recording type by making use of the above-mentioned characteristics.

[Method for Evaluating Characteristics]

A. Density of Protrusions, Kurtosis (Rku) on Roughness Curve

Using an atomic force microscope (AFM), measurement was performed in the obtained image under the following measurement conditions. The thresholds of protrusion heights were set to 1 nm, 2 nm and 10 nm, respectively, and the numbers of protrusions having a height of 1 nm or more, 2 nm or more and 10 nm or more were counted, respectively. The number of protrusions having a height of 1 nm or more and less than 2 nm was set to a value obtained by subtracting the number of protrusions having a height of 2 nm or more from the number of protrusions having a height of 1 nm or more. Measurement was performed 20 times at different locations, and the average thereof was calculated in terms of the density of protrusions per $mm^2$ to determine the density of protrusions for each height. In addition, the kurtosis (Rku) on a roughness curve was also measured 20 times at different locations, and the average thereof was determined.

Cantilever: silicon single crystal
Scan mode: tapping mode
Scan speed: 0.8 Hz
Measurement area: 5 μm square
Sample line: 256
Sample conditioning: left standing at 23° C. and 65% RH for 24 hours
AFM measurement environment: at 23° C. and 65% RH for 24 hours B. Metal Friction Coefficient (μk)

Using a tape running tester Model SFT-700 (manufactured by Yokohama System Research Institute Co., Ltd.), a film slit in a tape form to a width of 12.65 mm was run under an atmosphere at 23° C. and 65% RH with a load of 100 g applied to the film, and the friction coefficient (μk) after running was determined from the following expression. The film was set so as to bring the film surface into contact with a guide, and the friction coefficient was determined from the average of five measurements.

$$\mu k = 2/\pi \ln(T_2/T_1)$$

$T_1$: tension load (100 gf)
$T_2$: tension during running
Guide diameter: 6 mmΦ
Guide material: SUS 27 (surface roughness: 0.2 S)
Winding angle: 90°
Running distance: 10 cm
Running speed: 3.3 cm/s In addition, the slipperiness of the film was evaluated on the basis of the following criteria.
μk is less than 0.3: A
μk is 0.3 or more and less than 0.4: B
μk is 0.4 or more and less than 0.6: C
μk is 0.6 or more: D
A, B and C correspond to good slipperiness, and among them, A corresponds to excellent slipperiness.

C. Haze

Prepare three point (3 pieces) square film samples which are 5 cm on each side. Next, the sample is allowed to stand at 23° C. and 60% RH for 40 hours. Each sample is measured in accordance with JIS "Method for Determining Haze of Transparent Material" (K 7136, 2000 edition) using a turbidimeter "NDH 5000" manufactured by Nippon Denshoku Industries Co., Ltd. The values of hazes at three points (3 pieces) are averaged, and the average is defined as a haze value of the film.

D. Film Forming Ability

The number of breakages of the film in film formation performed under the conditions in examples and comparative examples was counted in terms of the number of breakages per hour, and evaluation was performed on the basis of the following criteria.
The number of breakages per hour is less than 1: A
The number of breakages per hour is 1: B
The number of breakages per hour is 2: C
The number of breakages per hour is 3 or more: D E. Number of Dent Defects For both surfaces of film of 10 m² (e.g. a film having a width of 1 m and a length of 10 m), the film surface was observed with naked eyes while attention was given to bright spots based on scattering of light including reflected light and transmitted light with a spotlight as a light source, and defects spots were marked with a pen. Further, a method for detecting a polarized disturbed bright spot by cross nicol using a polarized light source is also used. For the marked defect spots, the maximum diameter of the dent was measured with a stereoscopic microscope, the dent depth for dents having a maximum diameter of 3 mm or more was measured using a stereoscopic microscope with a Mireau type two-beam interferometric microscope apparatus (SMZ-10 manufactured by Nikon Corporation), and the number of dent defects having a depth of 0.5 μm or more and a maximum diameter of 3 mm or more was measured. The depth of the dent was determined by reading the disturbance of an interference fringe obtained at the obtained λ/2 pitch with a micrometer eyepiece, and carrying out the following procedure. The depth is a maximum depth from the surface of the film in the thickness direction, and when a raised portion exists around the dent defect, the maximum depth from the top of the raised portion to the bottom of the dent is determined.

$$\text{Depth} = \lambda/2 \times (B/A)$$

λ: 546 nm
A: read value of 2/2 by eyepiece
B: disturbance amount of interference fringe From the number of dent defects determined by the above-mentioned method, the defect frequency was determined on the basis of the following criteria.
The number of dent defects is less than 1 per m²: A
The number of dent defects is 1 per m² or more and less than 3 per m²: B
The number of dent defects is 3 per m² or more: C F. Evaluation of Resist Characteristics Evaluation is performed in accordance with the methods a to c below.

a. A negative resist "PMERN-HC 600" manufactured by TOKYO OHKA KOGYO Co., Ltd. is applied onto a 6-inch Si wafer polished on a single side, and the wafer is rotated with a large spinner to prepare a resist layer having a thickness of 7 μm. Next, a preheat treatment is performed for about 20 minutes at a temperature of 70° C. using a ventilating oven in which nitrogen is circulated.

b. A surface of the biaxially oriented thermoplastic resin film on which fine protrusions are formed is superposed so as to be in contact with the resist layer, a biaxially oriented thermoplastic resin film is laminated on the resist layer using a rubber roller, a reticle patterned with chromium metal is disposed on the film, and exposure is performed from above the reticle using an I ray (ultraviolet ray having a peak at a wavelength of 365 nm) stepper.

c. The polyester film is peeled off from the resist layer, and the resist layer is then put in a container containing a developer N-A5, and developed for about 1 minute.

Thereafter, the resist layer is taken out from the developer, and washed with water for about 1 minute. The states of 30 pieces of L/S (μm) (Line and Space)=10/10 μm in the resist pattern prepared after development were observed with a scanning electron microscope (SEM) at a magnification of about 800 to 3000 times, and evaluation was performed on the basis of the number of chipped pieces in the pattern.

A: The number of chipped pieces is 0 to 8.
B: The number of chipped pieces is 9 to 15.
C: The number of chipped pieces is 16 or more.

A corresponds to the best resist property, and C corresponds to the poorest resist property.

When the longitudinal direction or the transverse direction of the film to be measured is unknown in the above-described measurement, a direction in which the film has the highest refractive index is considered as the longitudinal direction, and a direction orthogonal to the longitudinal direction is considered as the transverse direction. In addition, the direction in which the film has the highest refractive index may be determined by measuring the refractive index in all the directions of the film by a refractometer, or determining a slow axis direction by a phase difference measuring apparatus (birefringence measuring apparatus) or the like.

G. Evaluation of Green Sheet Characteristics

Evaluation is performed in accordance with the methods a to b below.

a. Application of Release Layer

A coating liquid obtained by adjusting a crosslinked primer layer (trade name BY 24-846 manufactured by Dow Corning Toray Silicone Co., Ltd.) to a solid content of 1% by mass was applied to a surface of the biaxially oriented thermoplastic resin film on which fine protrusions were formed, and the applied coating liquid was dried. Here, the coating liquid was applied by a gravure coater so as to have a coating thickness of 0.1 μm after drying, and dried and cured at 100° C. for 20 seconds. After 1 hour or less, 100 parts by mass of an addition reaction type silicone resin (trade name LTC 750 A manufactured by Dow Corning Toray Silicone Co., Ltd.), and a coating liquid obtained by adjusting 2 parts by mass of a platinum catalyst (trade name SRX 212 manufactured by Dow Corning Toray Silicone Co., Ltd.) to a solid content of 5% by mass were applied by gravure so as to have a coating thickness of 0.1 μm after drying, and dried and cured at 120° C. for 30 seconds, and the film was then wound to obtain a release film.

b. Evaluation of Coated State of Green Sheet (Coatability of Ceramic Slurry)

Glass beads having a number average particle size of 2 mm were added to 100 parts by mass of barium titanate (trade name HPBT-1 manufactured by Fuji Titanium Industry Co., Ltd.), 10 parts by mass of polyvinyl butyral (trade name BL-1 manufactured by Sekisui Chemical Co., Ltd.), 5 parts by mass of dibutyl phthalate and 60 parts by mass of toluene-ethanol (mass ratio 30:30), and the mixture was mixed and dispersed for 20 hours by a jet mill, and then filtered to prepare a paste-like ceramic slurry. The obtained ceramic slurry was applied onto the release film by a die coater so as to have a thickness of 2 μm after drying, and dried, and the film was wound to obtain a green sheet. The green sheet wound as described above is delivered, and visually observed without being peeled off from the release film, so that the having pinhole or not, and the coated states of the sheet surface and the edge of the coating are examined. The area to be observed is 300 mm in width and 500 mm in length. For the green sheet formed on the release film, pinholes resulting from a coating failure, or the states of dents generated by transfer of the release film back surface to the surface are observed while the film is irradiated from the back surface by a backlight unit of 1000 lux.

A: Either pinholes or dents are not present.
B: Pinholes are not present, and 3 or less dents are present.
C: Pinholes are present at some parts, or 4 or more dents are present.

H. Evaluation of Magnetic Recording Medium Characteristics (Magnetic Recording Error Rate)

A film slit to a width of 1 m is conveyed at a tension of 200 N, a magnetic coating and a nonmagnetic coating are applied onto one surface of a substrate in accordance with the following description, and slit to a width of 12.65 mm to prepare pancake. (Hereinafter, the term "parts" means "parts by mass".)

Coating Liquid for Forming Magnetic Layer Formation

| | |
|---|---|
| Barium ferrite magnetic powder (plate diameter: 20.5 nm, plate thickness: 7.6 nm, plate ratio: 2.7, Hc: 191 kA/m (≈2400 Oe) saturation magnetization: 44 Am²/kg, BET specific surface area: 60 m²/g) | 100 parts |
| Polyurethane resin Mass average molecular weight: 10,000 Sulfonic acid functional group: 0.5 meq/g | 12 parts |
| α-alumina HIT 60 (manufactured by Sumitomo Chemical Co., Ltd.) | 8 parts |
| Carbon black # 55 (manufactured by Asahi Carbon Co., Ltd.) | |
| Particle size: 0.015 μm | 0.5 parts |
| Stearic acid | 0.5 parts |
| Butyl stearate | 2 parts |
| Methyl ethyl ketone | 180 parts |
| Cyclohexanone | 100 parts |

Coating Liquid for Forming Nonmagnetic Layer

| | |
|---|---|
| Nonmagnetic powder α iron oxide Average major axis length: 0.09 μm, specific surface area according to BET method: 50 m²/g pH 7 DBP oil absorption amount: 27 to 38 ml/100 g Surface treatment layer Al₂O₃: 8% by mass | 85 parts |
| Carbon black "CONDUCTEX" (registered trademark) SC-U (manufactured by Columbian Carbon Company) | 15 parts |
| Polyurethane resin UR 8200 (manufactured by Toyobo Co., Ltd.) | 22 parts |
| Phenylphosphonic acid | 3 parts |
| Cyclohexanone | 140 parts |
| Methyl ethyl ketone | 170 parts |
| Butyl stearate | 1 part |
| Stearic acid | 2 parts |
| Methyl ethyl ketone | 205 parts |
| Cyclohexanone | 135 parts |

For each of the above-described coating liquids, the components were kneaded with a kneader. By a pump, a coating liquid was caused to pass through a horizontal sand mill containing zirconia beads of 1.0 mm φ in an amount of 65% by volume based on the volume of a dispersion portion, and was dispersed at 2,000 rpm for 120 minutes (a time during which the coating liquid was retained in the dispersion portion). To the obtained dispersion liquid was added polyisocyanate in an amount of 5.0 parts for the coating for the nonmagnetic layer, and in an amount of 2.5 parts for the coating for the magnetic layer, 3 parts of methyl ethyl ketone was further added, and the mixture was filtered using a filter having an average pore size of 1 μm, thereby obtaining coating liquids for a coating liquid for forming a nonmagnetic layer and a coating liquid for forming a magnetic layer, respectively.

The obtained coating liquid for forming a nonmagnetic layer was applied onto the biaxially oriented thermoplastic resin film of the present invention so as to have a thickness of 0.8 μm after drying, and dried, the coating liquid for forming a magnetic layer was then applied in such a manner that the magnetic layer had a thickness of 0.07 μm after drying, and the film was oriented by a cobalt magnet having a magnetic force of 6,000 G (600 mT) and a solenoid having a magnetic force of 6,000 G (600 mT) while the magnetic layer was still in a wet state. Thereafter, a back coat layer (obtained by dispersing 100 parts of carbon black having an average particle size of 17 nm, 80 parts of calcium carbonate having an average particle size of 40 nm and 5 parts of α-alumina having an average particle size of 200 nm in polyurethane resin and polyisocyanate) was applied so as to have a thickness of 0.5 µm after calendering. Next, the film was subjected to calendering treatment at a temperature of 90° C. and a linear pressure of 300 kg/cm (294 kN/m) by a calender, and then cured at 65° C. for 72 hours. Further, the film was attached to an apparatus having an apparatus for delivering and winding a slit product in such a manner that a nonwoven fabric and a razor blade were abut against the magnetic surface, and the surface of the magnetic layer was cleaned with a tape cleaner to obtain a raw magnetic tape.

The obtained raw tape was slit to a width of 12.65 mm (½ inch), and incorporated into a case for LTO to prepare a data storage cartridge having a magnetic recording tape length of 960 m. The data storage was recorded using an LTO 6 drive manufactured by IBM Corporation in an environment at 23° C. and 50% RH (recording wavelength: 0.55 µm), and the cartridge was then stored in an environment at 50° C. and 80% RH for 7 days. After the cartridge was stored at normal temperature for 1 day, full length reproduction was performed, and the error rate of signals during reproduction was measured. The error rate is calculated from error information (the number of error bits) output from the drive in accordance with the following expression. The error rate was evaluated on the basis of the following criteria.

Error rate=(number of error bits)/(number of write bits)

A: The error rate is less than $1.0 \times 10^{-6}$.
B: The error rate is $1.0 \times 10^{-6}$ or more and less than $1.0 \times 10^{-5}$.
C: The error rate is $1.0 \times 10^{-5}$ or more and less than $1.0 \times 10^{-4}$.
D: The error rate is $1.0 \times 10^{-4}$ or more.

EXAMPLES

Hereinafter, the present invention will be described by way of examples, but the present invention is not necessarily limited to these examples.

Example 1

To dimethyl terephthalate (DMT) were added 1.9 mol of ethylene glycol based on 1 mol of DMT, and 0.05 parts by weight of magnesium acetate tetrahydrate and 0.015 parts by weight of phosphoric acid based on 100 parts by weight of DMT, and the mixture was heated to perform transesterification. Subsequently, 0.025 parts by weight of antimony trioxide was added, the temperature was elevated by heating, and polycondensation was performed under vacuum to obtain polyester pellets having substantially no particles.

The polyester was dried under reduced pressure at 160° C. for 8 hours, then supplied to an extruder, melted and extruded, filtered through a filter, and drawn onto a cooling roll through a die, and wound around a casting drum by a static electricity application casting method to be cooled and solidified, thereby obtaining an unstretched film The unstretched film was led between opposing electrodes and grounded roll, a nitrogen gas was introduced into the apparatus, and atmospheric pressure glow discharge treatment was performed under such conditions that the E value was 400 W·min/m². Here, the grounded roll was cooled so that the film surface temperature of the treated surface was 50° C.

The unstretched film after treatment was stretched by a sequential biaxial stretching machine at a draw ratio of 3.3 in longitudinal direction (at a temperature of 95° C.) and at a draw ratio of 3.3 in transverse direction (at a temperature of 100° C.), so that the film was stretched at a draw ratio of 10.9 in total, and heat treatment was then performed at 220° C. under a fixed length. Thereafter, the film was subjected to relaxation treatment in transverse direction to obtain a biaxially oriented thermoplastic resin film having a thickness of 16 µm. The characteristics etc. of the obtained biaxially oriented thermoplastic resin film thus obtained are shown in Tables 1 and 2. It was found that the film was excellent in slipperiness and film forming ability.

Example 2

Except that the E value in atmospheric pressure glow discharge treatment was 800 W·min/m², the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was excellent in slipperiness and film forming ability.

Example 3

Except that the E value in atmospheric pressure glow discharge treatment was 100 W·min/m², the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was excellent in slipperiness and film forming ability.

Example 4

Except that after an unstretched film was obtained by the same method as in Example 1, surface treatment was performed by irradiating the unstretched film with ultraviolet light having an energy of 400 mJ/cm² instead of atmospheric pressure glow discharge treatment, the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was excellent in slipperiness and film forming ability.

Example 5

Except that after an unstretched film was obtained by the same method as in Example 1, the unstretched film was subjected to arc discharge corona treatment in an air atmosphere under such conditions that the E value was 400 W·min/cm² instead of atmospheric pressure glow discharge treatment, the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was excellent in slipperiness and film forming ability.

Example 6

Except that in place of polyester, polypropylene was used, and supplied to an extruder without passing through a drying process, the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was excellent in slipperiness and film forming ability.

Example 7

Except that in place of polyester, polyphenylene sulfide was used, the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was excellent in slipperiness and film forming ability.

Example 8

Except that in place of polyester, polyimide was used, the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was excellent in slipperiness and film forming ability.

Example 9

The unstretched film obtained in Example 1 was stretched between heating rolls in longitudinal direction at a draw ratio of 3.3 (at a temperature of 95° C.), the thus-obtained film was led between opposing electrodes and grounded roll, a nitrogen gas was introduced into the apparatus, and atmospheric pressure glow discharge treatment was performed under such conditions that the E value was 400 W·min/m$^2$. Here, the grounded roll was cooled so that the film surface temperature of the treated surface was 50° C.
The uniaxially stretched film after treatment was stretched in transverse direction at a draw ratio of 3.3 (at a temperature of 100° C.) in a tenter, so that the film was stretched at a draw ratio of 10.9 in total, and heat treatment was then performed at 220° C. under a fixed length. Thereafter, the film was subjected to relaxation treatment in transverse direction to obtain a biaxially oriented thermoplastic resin film having a thickness of 16 μm. The characteristics etc. of the obtained biaxially oriented thermoplastic resin film thus obtained are shown in Tables 1 and 2. It was found that the film was excellent in slipperiness and film forming ability.

Example 10

The unstretched film obtained in Example 1 was led between opposing electrodes and grounded roll, a nitrogen gas was introduced into the apparatus, and atmospheric pressure glow discharge treatment was performed under such conditions that the E value was 400 W·min/m$^2$. Here, the grounded roll was cooled so that the film surface temperature of the treated surface was 50° C.
The unstretched film after treatment was stretched by a simultaneous biaxial stretching machine at a draw ratio of 3.3 in longitudinal direction and at a draw ratio of 3.3 in transverse direction (at a temperature of 100° C.), so that the film was stretched at a draw ratio of 10.9 in total, and heat treatment was then performed at 220° C. under a fixed length. Thereafter, the film was subjected to relaxation treatment in transverse direction to obtain a biaxially oriented thermoplastic resin film having a thickness of 16 μm. The characteristics etc. of the obtained biaxially oriented thermoplastic resin film thus obtained are shown Tables 1 and 2. It was found that the film was excellent in slipperiness and film forming ability.

Example 11

The PET resin dried by the same method as in Example 1 and master pellets of particles as described later were supplied to different extruders so as to obtain the later-described addition amounts of particles, respectively, melted and extruded, filtered through a filter, and then merged and stacked with confluence block to form a three-layer structure of layer A/layer B/layer A. Thereafter, the film was drawn onto a cooling roll, and wound around a casting drum by a static electricity application casting method to be cooled and solidified, thereby obtaining an unstretched PET film in which both surface layers (layers A) contained 0.15% by weight of aggregated alumina particles having an average secondary particle size of 0.08 μm, and the inner layer (layer B) did not contain particles. By the same method as in Example 1, the unstretched film was led between opposing electrodes and grounded roll, a nitrogen gas was introduced into the apparatus, and atmospheric pressure glow discharge treatment was performed under such conditions that the E value was 400 W·min/m$^2$. Here, the grounded roll was cooled so that the film surface temperature of the treated surface was 50° C. Further, the film was biaxially stretched to obtain a biaxially oriented thermoplastic resin film having a total thickness of 16 μm, with the layer A/layer B/layer A stacking thickness being 0.6 μm/14.8 μm/0.6 μm. The characteristics etc. of the obtained biaxially oriented thermoplastic resin film thus obtained are shown in Tables 1 and 2. It was found that the film was excellent in slipperiness and film forming ability.

Comparative Example 1

Except that after an unstretched film was obtained by the same method as in Example 1, the film was introduced into a sequential biaxial stretching machine without performing atmospheric pressure glow discharge treatment, the same method as in Example 1 was carried out to obtain a biaxially oriented thermoplastic resin film. The characteristics etc. of the obtained biaxially oriented thermoplastic resin film thus obtained are shown in Tables 1 and 2. It was found that the film was poor in slipperiness.

Comparative Example 2

Except that the film surface temperature was 180° C. at the time of performing arc discharge corona treatment in an air atmosphere, the same method as in Example 5 was carried out to obtain a biaxially oriented thermoplastic resin film. The characteristics etc. of the obtained biaxially oriented thermoplastic resin film thus obtained are shown in Tables 1 and 2. It was found that the film was poor in slipperiness.

Comparative Example 3

Except that the film surface temperature was 180° C. at the time of performing atmospheric pressure glow discharge treatment in a nitrogen atmosphere, the same method as in Example 1 was carried out to obtain a biaxially oriented thermoplastic resin film. The characteristics etc. of the obtained thermoplastic resin film thus obtained are shown in Tables 1 and 2. It was found that the film was poor in slipperiness.

Comparative Example 4

An unstretched film was prepared using a melamine resin in place of polyester, subjected to atmospheric pressure glow discharge treatment in the same manner as in Example 1, and sequentially biaxially stretched was in the same manner as in Example 1, but the film was poor in film forming ability, so that film breakage frequently occurred, and therefore it was impossible to obtain a biaxially oriented film.

Comparative Example 5

An unstretched film was obtained by the same method as in Example 1, and then subjected to atmospheric pressure glow discharge treatment. Without performing subsequent biaxial stretching, an unstretched film was obtained.
Characteristics etc. of the obtained film are shown in Tables 1 and 2. It was found that the film was poor in slipperiness.

Comparative Example 6

An unstretched film was obtained by the same method as in Example 1, then subjected to atmospheric pressure glow discharge treatment, and then stretched in longitudinal direction at a draw ratio of 3.3 to obtain a monoaxially oriented film. Characteristics etc. of the obtained film are shown in Tables 1 and 2. It was found that the film was poor in slipperiness.

Comparative Example 7

The PET resin dried by the same method as in Example 1 and master pellets of particles as described later were supplied to different extruders so as to obtain the later-described addition amounts of particles, respectively, melted and extruded, filtered through a filter, and then merged and stacked with confluence block to form a three-layer structure of layer A/layer B/layer A. Thereafter, the film was drawn onto a cooling roll, and wound around a casting drum by a static electricity application casting method to be cooled and solidified, thereby obtaining an unstretched PET film in which both surface layers (layers A) contained 0.08% by weight of divinylbenzene/styrene copolymer particles having an average particle size of 0.70 μm and 0.15% by weight of aggregated alumina particles having an average secondary particle size of 0.08 μm, and the inner layer (layer B) did not contain particles. The unstretched film was biaxially stretched by the same method as in Example 1 to obtain a biaxially oriented thermoplastic resin film having a total thickness of 16 μm, with the layer A/layer B/layer A stacking thickness being 0.6 μm/14.8 μm/0.6 μm. The characteristics etc. of the obtained biaxially oriented thermoplastic resin film thus obtained are shown in Tables 1 and 2. It was found that the film had many defects.

TABLE 1

| | Main constituent components | Orientation | Surface treatment method | Density of surface protrutions on treated surface (pieces/mm$^2$) | | Kurtosis (Rku) | Haze (%) | Metal friction coefficient (μk) |
|---|---|---|---|---|---|---|---|---|
| | | | | 1 nm or more and less than 2 nm | 10 nm or more | | | |
| Example 1 | PET | Biaxial orientation | plasma | $6 \times 10^7$ | $8 \times 10^4$ | 3.8 | 0.5 | 0.3 |
| Example 2 | PET | Biaxial orientation | plasma | $2 \times 10^8$ | $8 \times 10^4$ | 4.5 | 0.5 | 0.2 |
| Example 3 | PET | Biaxial orientation | plasma | $3 \times 10^7$ | $2 \times 10^6$ | 3.3 | 1.5 | 0.5 |
| Example 4 | PET | Biaxial orientation | UV | $2 \times 10^7$ | $2 \times 10^5$ | 8.2 | 0.5 | 0.5 |
| Example 5 | PET | Biaxial orientation | corona | $1 \times 10^7$ | $2 \times 10^6$ | 3.0 | 0.5 | 0.5 |
| Example 6 | PP | Biaxial orientation | plasma | $2 \times 10^7$ | $2 \times 10^5$ | 3.5 | 5 | 0.5 |
| Example 7 | PPS | Biaxial orientation | plasma | $2 \times 10^7$ | $2 \times 10^5$ | 3.0 | 50 | 0.4 |
| Example 8 | PI | Biaxial orientation | plasma | $2 \times 10^7$ | $2 \times 10^5$ | 3.0 | 20 | 0.4 |
| Example 9 | PET | Biaxial orientation | plasma | $3 \times 10^7$ | $8 \times 10^4$ | 3.2 | 0.5 | 0.5 |
| Example 10 | PET | Biaxial orientation | plasma | $4 \times 10^7$ | $4 \times 10^4$ | 3.5 | 0.4 | 0.4 |
| Example 11 | PET | Biaxial orientation | Plasma + particles | $2 \times 10^7$ | $4 \times 10^6$ | 6.0 | 0.7 | 0.2 |
| Comparative Example 1 | PET | Biaxial orientation | — | $5 \times 10^6$ | $2 \times 10^6$ | 2.5 | 0.5 | 0.7 |
| Comparative Example 2 | PET | Biaxial orientation | corona | $9 \times 10^6$ | $8 \times 10^6$ | 2.5 | 2 | 0.7 |
| Comparative Example 3 | PET | Biaxial orientation | plasma | $7 \times 10^6$ | $2 \times 10^5$ | 2.3 | 0.5 | 0.7 |
| Comparative Example 4 | Melamine resin | Biaxial orientation | plasma | — | — | — | — | — |
| Comparative Example 5 | PET | Unoriented | plasma | $2 \times 10^7$ | $1 \times 10^5$ | 2.0 | 0.5 | 0.7 |
| Comparative Example 6 | PET | Uniaxial orientation | plasma | $5 \times 10^6$ | $1 \times 10^5$ | 2.5 | 0.5 | 0.7 |
| Comparative Example 7 | PET | Biaxial orientation | Addition of particles | $7 \times 10^6$ | $1 \times 10^7$ | 12.0 | 0.9 | 0.4 |

TABLE 2

| | Slipperiness | Film forming ability | Dent defects | Resist characteristics | Green sheet characteristics | Magnetic recording error rate |
|---|---|---|---|---|---|---|
| | | Evaluation of characteristics | | | | |
| Example 1 | B | A | A | A | A | B |
| Example 2 | A | A | A | A | A | A |
| Example 3 | C | A | A | A | A | B |
| Example 4 | C | B | A | A | A | B |
| Example 5 | C | B | A | A | A | B |
| Example 6 | C | A | A | B | A | C |
| Example 7 | C | B | B | B | B | C |
| Example 8 | C | C | A | B | B | C |
| Example 9 | C | A | A | A | A | B |
| Example 10 | B | A | A | A | A | B |
| Example 11 | A | A | B | B | B | B |
| Comparative Example 1 | D | A | A | A | A | B |
| Comparative Example 2 | D | C | B | B | B | C |
| Comparative Example 3 | D | C | B | B | B | C |
| Comparative Example 4 | — | D | — | — | — | — |
| Comparative Example 5 | D | A | B | B | B | D |
| Comparative Example 6 | D | A | B | B | B | D |
| Comparative Example 7 | A | A | C | C | C | C |

The biaxially oriented thermoplastic resin film of the present invention is capable of suppressing defects such as scratches and the like in a process and defects in a processing process owing to favorable slipperiness and film forming ability, and therefore can be suitably used as a polyester film for a dry film resist substrate, which is used with a photosensitive resin composition stacked on one side, a film for an optical device base material, a release film for a ceramic capacitor, or a film for a magnetic recording medium.

The invention claimed is:

1. A biaxially oriented thermoplastic resin film comprising polyester as a main component, at least one surface of which has protrusions each having a height of 1 nm or more and less than 2 nm at a density of $1\times10^7$ to $1\times10^9$ protrusions per $mm^2$,
wherein the kurtosis of the film surface is more than 3.0 and not more than 8.0, wherein the haze is 0.1 to 2.0%.

2. The biaxially oriented thermoplastic resin film according to claim 1, wherein the metal friction coefficient (μk) of the film surface having protrusions each having a height of 1 nm or more and less than 2 nm at a density of $1\times10^7$ to $1\times10^9$ protrusions per $mm^2$ is 0.1 to 0.5.

3. The biaxially oriented thermoplastic resin film according to claim 1, wherein the density of protrusions each having a height of 10 nm or more on the film surface having protrusions each having a height of 1 nm or more and less than 2 nm at a density of $1\times10^7$ to $1\times10^9$ protrusions per $mm^2$ is $1\times10^6$ protrusions per $mm^2$ or less.

4. The biaxially oriented thermoplastic resin film according to claim 1, which is configured for use as a release film.

5. The biaxially oriented thermoplastic resin film according to claim 4, which is configured for use as a film for a dry film resist substrate.

6. The biaxially oriented thermoplastic resin film according to claim 4, which is configured for use as a film for a substrate for molding of a green sheet in a process for producing a multilayer ceramic capacitor.

7. The biaxially oriented thermoplastic resin film according to claim 4, which is configured for use as a release film for polarizer.

8. The biaxially oriented thermoplastic resin film according to claim 1, which is configured for use as a film for an optical member.

9. The biaxially oriented thermoplastic resin film according to claim 1, which is configured for use as a base film for a magnetic recording medium of coat-type digital recording type.

10. A magnetic recording medium using the biaxially oriented thermoplastic resin film according to claim 1.

* * * * *